US009408246B2

United States Patent
Muley et al.

(10) Patent No.: US 9,408,246 B2
(45) Date of Patent: Aug. 2, 2016

(54) SYSTEM AND METHOD FOR SEAMLESS WI-FI TO UMTS HANDOVER

(71) Applicants: Praveen Vasant Muley, Mountain View, CA (US); Vachaspathi Peter Kompella, Cupertino, CA (US); Jeremy M Brayley, Pittsburgh, PA (US)

(72) Inventors: Praveen Vasant Muley, Mountain View, CA (US); Vachaspathi Peter Kompella, Cupertino, CA (US); Jeremy M Brayley, Pittsburgh, PA (US)

(73) Assignee: Alcatel Lucent, Boulogne-Billancourt (FR)

( * ) Notice: Subject to any disclaimer, the term of this patent is extended or adjusted under 35 U.S.C. 154(b) by 53 days.

(21) Appl. No.: 14/318,639

(22) Filed: Jun. 28, 2014

(65) Prior Publication Data

US 2015/0003415 A1 Jan. 1, 2015

Related U.S. Application Data

(60) Provisional application No. 61/840,944, filed on Jun. 28, 2013.

(51) Int. Cl.
*H04W 76/02* (2009.01)
*H04W 36/00* (2009.01)

(52) U.S. Cl.
CPC ........ *H04W 76/026* (2013.01); *H04W 36/0022* (2013.01); *H04W 76/022* (2013.01)

(58) Field of Classification Search
CPC .................... H04W 36/0022; H04W 36/0066; H04W 36/14; H04W 76/026; H04W 76/045
See application file for complete search history.

(56) References Cited

U.S. PATENT DOCUMENTS

2012/0278416 A1* 11/2012 Hurtta .................... H04W 8/082 709/206
2012/0307797 A1* 12/2012 Yuan ................. H04W 36/0022 370/331

* cited by examiner

*Primary Examiner* — Pao Sinkantarakorn
(74) *Attorney, Agent, or Firm* — Tong, Rea, Bentley & Kim, LLC

(57) ABSTRACT

Systems, methods, apparatus and mechanism for maintaining an existing UE control session attachment while changing bearers of a UE data session, such as migrating between UMTS and non-UMTS bearers terminating at a common gateway device.

20 Claims, 5 Drawing Sheets

SYSTEM AND METHOD FOR SEAMLESS WI-FI TO UMTS HANDOVER

CROSS-REFERENCE TO RELATED APPLICATIONS

This application claims priority to U.S. Provisional Patent Application Ser. No. 61/840,944, entitled "SYSTEM AND METHOD FOR SEAMLESS WI-FI TO UMTS HANDOVER," which is hereby incorporated by reference in its entirety.

TECHNICAL FIELD

The invention relates generally to communications systems and, more specifically but not exclusively, to enabling a substantially seamless handover of user equipment between Wi-Fi and UMTS networks.

BACKGROUND

Mobile devices such as smart phones, tablet computers and other user equipment (UE) are often capable of connecting to multiple types of wireless access networks for receiving mobile services, such as Wi-Fi networks (e.g., 802.1X networks and the like) and mobile/cellular networks (e.g., Universal Mobile Telecommunications System (UMTS), General packet radio service (GPRS), UMTS/GPRS, Global System for Mobile Communications (GSM), Long-Term Evolution (LTE), various 3G/4G/5G systems and the like). Advantageously, subscribers having such UE may benefit from increased throughput for subscriber mobile services as well as redundant communications links supporting such mobile services.

When a UE selects a wireless access network to receive mobile services, a new session is instantiated for the UE via the selected wireless access network. When a UE receiving mobile services via a first wireless access network selects a second wireless access network to receive the mobile services, the transition between the first and second wireless access networks requires reestablishing at the second wireless access network the desired mobile services.

Unfortunately, there is no mechanism to indicate handover from, illustratively, a carrier Wi-Fi access network to a UMTS network. Thus, by transitioning between first and second wireless access networks, the mobile services provided to the UE are necessarily disrupted by session reestablishment and mobile services reestablishment processes.

SUMMARY

Various deficiencies of the prior art are addressed by the present invention of systems, methods, apparatus and mechanism for maintaining an existing UE control session attachment while changing IP Connectivity Access Network (IP-CAN) bearers of a UE data session, such as migrating between UMTS and non-UMTS bearers terminating at a common gateway device. In this manner, substantially seamless mobile service continuity is provided for UE transitioning between wireless access networks, such as between Wi-Fi and UMTS or GPRS networks.

Various embodiments also provide enhanced control mechanisms, such as providing an ability of a GGSN or PGW to spread a control request coming from MME or SGSN or SGW to go to the correct GGSN or PGW.

A method according to one embodiment comprises receiving, by a Gateway GPRS Support Node (GGSN), a create packet data protocol (PDP) request associated with a UE authenticated with a first Internet Protocol Connectivity Access Network (IP-CAN) and attached to a Serving GPRS support node (SGSN); and creating, by the GGSN in response to a non-new-control indication within the create PDP request, a PDP context configured to establish a second IP-CAN path between the UE, the SGSN and the GGSN without changing UE attachment to the SGSN.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various embodiments address need to provide a seamless continuity of user experience for dual-mode user equipment (UE) transitioning between IP Connectivity Access Networks (IP-CANs), illustratively, a Wi-Fi network or communications link and a UMTS or GPRS radio network or communications link (or vice versa). As such, the invention will be primarily described within the context of such an arrangement. However, it will be appreciated that the invention is also applicable to handover mechanisms and the like suitable for use in various other arrangements which are also contemplated by the inventors as benefiting from the invention.

Various embodiments operate to indicate that such a transition between access technologies is desired without the corresponding change in control plane session. Thus, various embodiments operate to maintain the existing attachment of the UE to the SGSN, while changing the PDP context of existing sessions from the non-3GPP network to the 3GPP network. This request to preserve the existing attachment during an access technology handover may be indicated by the UE either explicitly or implicitly.

Generally speaking, various embodiments provide a mechanism for maintaining an existing UE control session attachment while changing UE data session bearers, such data bearers of different IP Connectivity Access Networks (IP-CANs).

Figure 1:
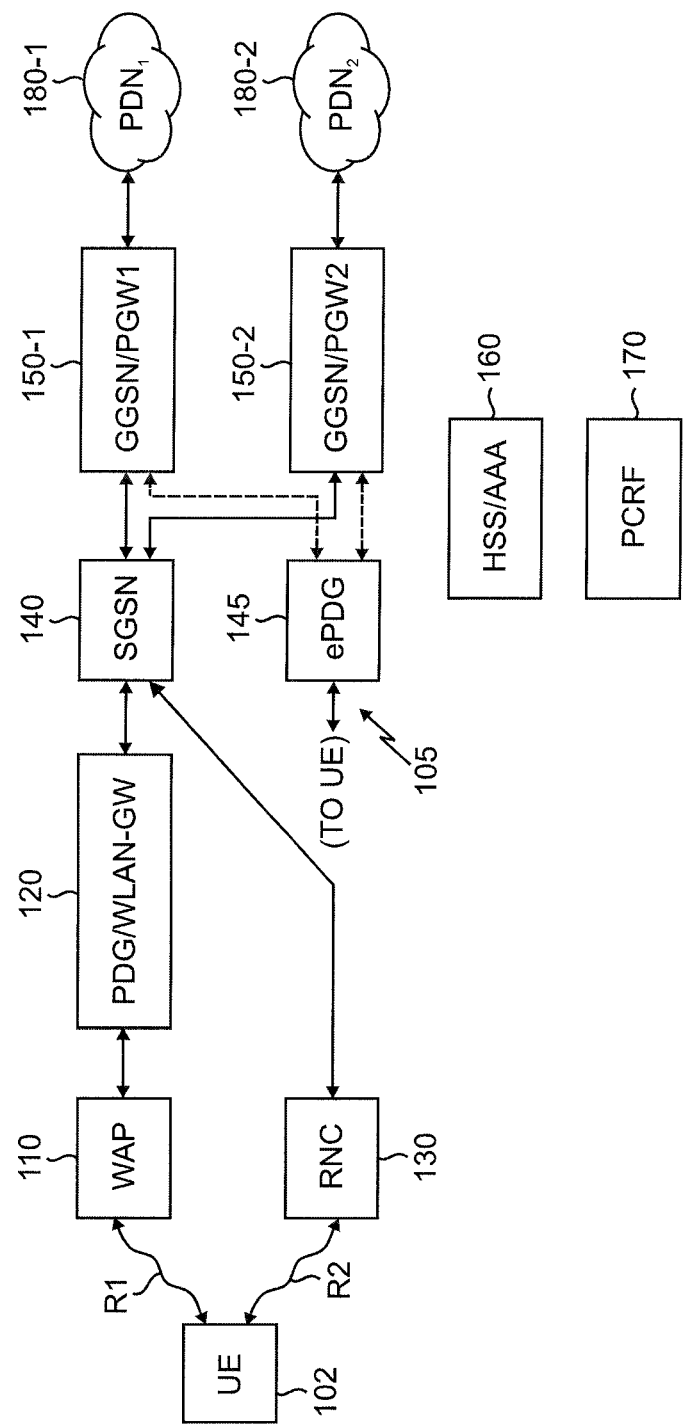
FIG. 1 depicts a high-level block diagram of a system benefiting from one or more embodiments.

FIG. 1 depicts a high-level block diagram of a system benefiting from one or more embodiments. Generally speaking, the system 100 of FIG. 1 contemplates user equipment (UE) illustratively capable of accessing a mobile network directly via a Radio Network Controller (RNC) or via a wireless access point (WAP). The mobile network may comprise a 3G/4G mobile network such as a 3GPP network, Universal Mobile Telecommunications System (UMTS) network, long-term evolution (LTE) network and so on. The WAP may be associated with a Wi-Fi, WiMAX or other wireless access network. Various embodiments provide a mechanism whereby UE control/data support is transitioned between Wi-Fi and UMTS without initiating a new control session with the UE, thereby avoiding an interruption of a currently active UE service such as an application flow, service data flow and the like.

The system 100 of FIG. 1 comprises, illustratively, user equipment (UE) 102, Wireless Access Point (WAP) 110, Packet Data Gateway (PDG)/Wireless LAN gateway (WLAN-GW) 120, Serving GPRS Support Node (SGSN) 140, first 150-1 and second 150-2 Gateway GPRS Support Node (GGSN)/Packet Gateway (PGW), Home Subscriber Server (HSS)/Authentication, Authorization and Accounting (AAA) server 160, Policy and Charging Rules Function (PCRF) 170 and various other network elements (not shown) supporting control plane and/or data plane operations. Some embodiments utilize an evolved Packet Data Gateway (ePDG) 145 to provide packets or traffic flows. Numerous other modifications to the illustrative topology are also contemplated to benefit from the various embodiments.

Generally speaking, UE 102 communicates with a Packet Data Gateway (PDG) or Wireless Local Area Network Gateway (WLAN-GW) 120 via a Wireless Access Point (WAP) 110 to receive mobile services thereby. The mobile services are communicated between the PDG/WLAN-GW 120 and a first Gateway GPRS Support Node (GGSN) or packet Gateway (PGW) 150-1 via a tunnel such as a GPRS Tunneling Protocol (GTP) tunnel. The GGSN/PGW 150-1 communicates with a public Packet Data Network (PDN) 180-1.

Within the context of the system 100 of FIG. 1, it is noted that SGSN 140 and GGSN/PGW 150 are depicted as providing a Service Data Flow (SDF) or Application Flow (AF) to a UE 102. Given that the UE 102 is associated with the same Internet Protocol (IP) address for each of a Wi-Fi access bearer path and a 3GPP/LTE bearer path, Service Data Flow (SDF), Application Flow (AF) and/or other traffic flowing to or from the UE may be addressed using this same IP address. As such, Wi-Fi to UMTS or UMTS to Wi-Fi handover may occur while retaining an existing control plane session between the UE and SGSN or GGSN/PGW.

When the UE is performing handover from the Wi-Fi to UMTS network, it is indicated from UE that this is a handover and NOT a new control request. Once the GGSN receives the control request it identifies this non-new-control parameter by looking at the indication given by UE in the initial message. The GGSN looks for the UE credentials in its data-base, but if not found then the GGSN looks at one or more configurations to identify the correct UE GGSN to provide service and passes the control request to the correct GGSN. The correct GGSN processes the request and sends a response to SGSN to provide thereby new control and data tunnel endpoints of the GGSN. The SGSN responds back with the same IP address which it received from the handset. In various embodiments, a MME/SGSN may interact with the AAA, such as via a s6a interface, to determine the correct GGSN to send the creation of PDP request with Handover.

In this manner, a substantially seamless handover of UE mobile services between non-3GPP and 3GPP networks is provided. In this case, the UE and GGSN are the only elements in the network aware of this handover, whereas the rest of the elements treat this as new creation of a PDP context over the UMTS infrastructure.

Various embodiments provide a mechanism by which a substantially seamless UE handover from, illustratively, carrier Wi-Fi to UMTS (or vice versa) is enabled and appropriately indicated either explicitly or implicitly to the relevant management/control mechanisms.

Various embodiments contemplate mechanisms for explicit indication of UE handover from one RAT to another RAT without establishing a new control session. For example, various embodiments contemplate using a Protocol Configuration Options (PCO) component, or other component of a message for communicating an explicit "non-new-control" (NNC) indicator for indicating to a GGSN or other Packet Data Gateway function that a Wi-Fi to UMTS session handover (or UMTS to Wi-Fi session handover) associated with a particular UE should occur without initiating a new control session with the UE. The PCO is a component of an Non-Access Stratum (NAS) message and maybe be carried via many different messages, such as a PDN Connectivity Request, ActivateDefaultEPSBearerContextRequest, activate PDP context, ActivateDefaultEPSBearerContextAccept, and so on. The PCO structure is known to those skilled in the art.

In addition, IP address allocation within the Wi-Fi network may also be indicated within the PCO or other component. In operation, the UMTS infrastructure treats connection setup associated with handover as a regular attach. A GGSN capable of supporting the handover may use the PCO to understand the indication of the handover. Various methods of smooth handover are contemplated, such as local pool configuration (i.e., configuration maps IP pools to GGSN IP), Remote Authentication Dial-In User Service (RADIUS) allocated IP Address, Rel 8 SGSN using S6a, and so on.

Various embodiments contemplate mechanisms for implicit indication of UE handover without a new control session. For example, various embodiments contemplate that a "non-new-control" (NNC) handover (i.e., UE handover without a new control session) is implied where only the IP address associated with the UE is communicated via the PCO or other means. For example, if the IP address of the UE matches an allocated address from a pool of addresses associated with Wi-Fi sessions then, according to some embodiments, a NNC handover is implied rather than explicitly indicated. For example, the GGSN or PGW session records may include UE International Mobile Subscriber Identity (IMSI) and WAP Access Point Name (APN) information, which information may be used along with the received UE IP address to determine that the UE is associated with an existing control session that will still perform its intended control functions after handover from Wi-Fi to UMTS (or UMTS to Wi-Fi) such that there is no need to initiate a new control session and, therefore, no need to disrupt the user experience by initiating a new control session. Thus, the SGSN or GGSN/PGW may process the received IP address associated with a UE.

While FIG. 1 is depicted and described above within the context of an exemplary topology in which a GGSN/PGW 150 communicates with a SGSN 140 via, illustratively, a Gn interface. The SGSN 140 may communicate with the HSS 160 via, illustratively, a S6d interface. It will be appreciated that other gateway devices may also be used within the context of various embodiments. For example, in various embodiments the GGSN/PGW 150 communicates with an evolved Packet Data Gateway (ePDG) 145 via, illustratively, a S2b interface. The ePDG 145, which is operatively coupled to various UE (not shown), may communicate with the HSS 160 via, illustratively, a SWm interface. Further, a Wi-Fi gateway may communicate with the GGSN/PGW directly or via a SGSN (such as depicted PDG/WLAN-GW 120). The Wi-Fi gateway may communicate with the HSS 160 via, illustratively, a STa interface. Within the context of these various embodiments, if a UE attaches in a Wi-Fi network, the HSS is updated with the PGW selected. When the UE moves to the SGSN or ePDG, the SGSN or ePDG knows which GGSN/PGW anchors the session. However, since UE heretofore cannot indicate a handover function, the various embodiments contemplate mechanisms by which a handover of UE traffic between different access networks may be provided without initializing a new control session.

Figure 2:
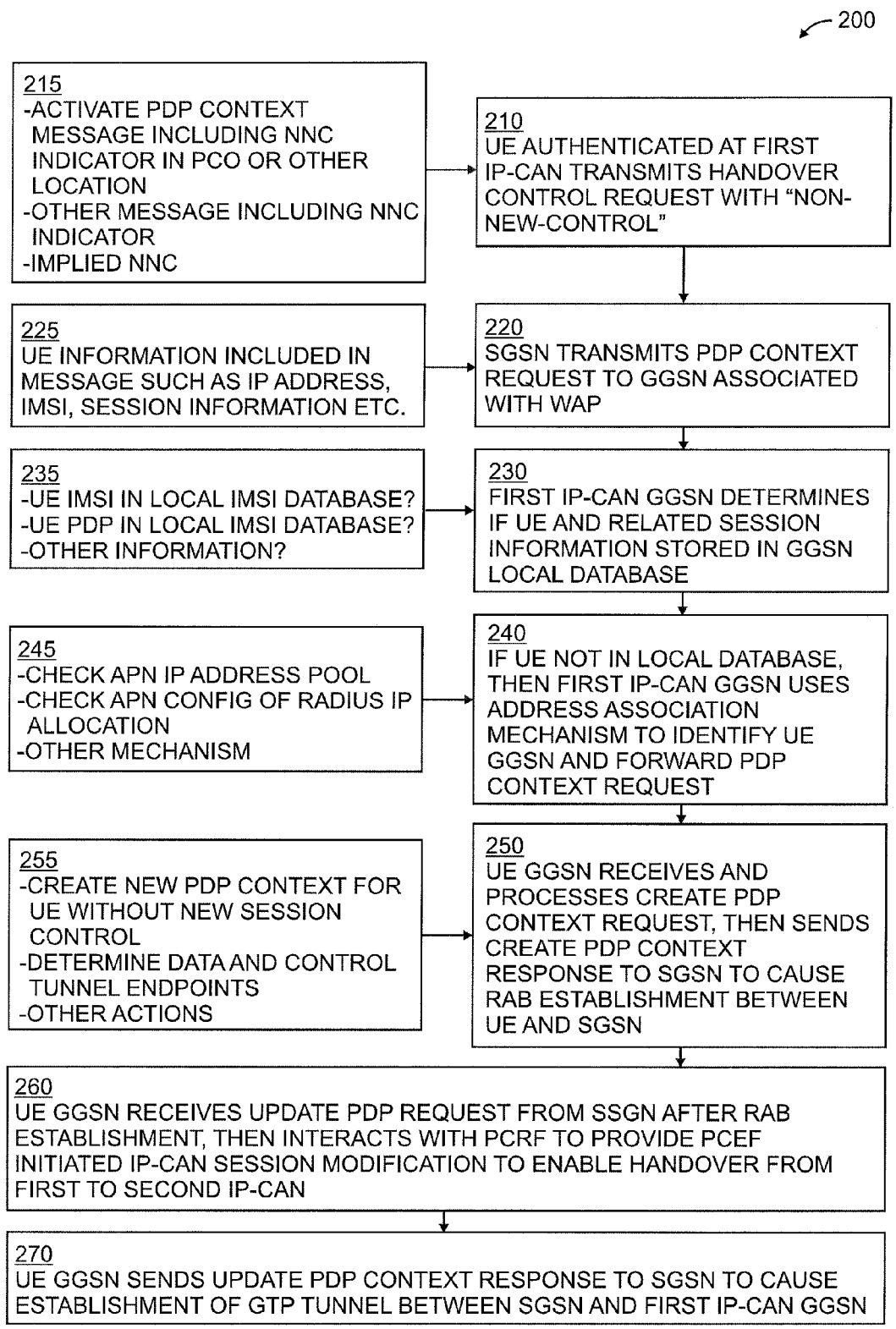
FIG. 2 depicts a flow diagram of a method according to one embodiment.

FIG. 2 depicts a flow diagram of a method according to one embodiment wherein a UE authenticated with respect to a first IP-CAN (e.g., a Wi-Fi network using WAP 110) is migrated or handed over to a second IP-CAN (e.g., a UMTS network).

At step 210, a UE 102 authenticated at an APN of a first IP-CAN (e.g., WAP 110) transmits a handover control request with an explicit or implicit "non-new-control" indication toward the SGSN 140. Referring to box 215, the handover control request comprises, illustratively, an activate PDP context message in which a non-new-control (NNC) indicator is included within a Protocol Configuration Options (PCO) location or some other location of an activate PDP context message, GTP message header (or other message type/location). The indicator may also be implied, such as via the UE IP address being included within the PCO location or some other location of an activate PDP context message, GTP message header (or other message type/location).

At step 220, the SGSN 140 generates a PDP context request message (e.g., a create or update PDP context message) using information from the activate PDP context message and transmits the PDP context request message toward the GGSN associated with the APN of the first IP-CAN (illustratively GGSN 150-1 for WAP 110). Referring to box 225, UE information may include IP address, IMSI, session information, APN and the like.

At step 230, the first IP-CAN GGSN determines if the UE and related session information are stored in the local GGSN database. Referring to box 235, this determination may be made with respect to the UE IMSI, UE PDP information and/or other information.

If the UE and related session information is not stored in the local database of the first IP-CAN GGSN, then the first IP-CAN GGSN is not the correct GGSN with respect to providing mobile network communications for the UE. In this case, the first IP-CAN GGSN uses an address association mechanism to identify the correct UE GGSN and then to forward to the correct GGSN the PDP context request message previously received from the SGSN. Referring to box 245, the address association mechanism may comprise checking an Access Point Name (APN) Internet Protocol (IP) address pool, APN configuration of RADIUS IP allocations, or some other mechanism.

At step 250, the identified UE GGSN (illustratively, GGSN 150-2) receives and processes the PDP context request message. Referring to box 255, the UE GGSN creates a new PDP context for the UE without new session control, and determines data and control tunnel endpoints associated with the new PDP context. Other actions may also be taken by the UE GGSN. The new tunnel endpoints will be associated with a radio and access bearer (RAB) between the UE and the SGSN, as well as a GTP tunnel between the SGSN 140 and the GGSN 150-1 or UE GGSN 150-2. The UE GGSN then sends a PDP context response message to the SGSN to cause thereby the establishment of the RAB.

At step 260, the UE GGSN receives an update PDP request from the SGSN after RAB establishment. Then, the UE GGSN interacts with the Policy and Charging Rules Function (PCRF) 170 to provide Policy and Charging Enforcement Function (PCEF) initiated IP Connectivity Access Network (IP-CAN) Session Modification to move or handover the various UE session support functions from first IP-CAN (e.g., WAP) related or supported control and data paths to a second IP-CAN (e.g., mobile network) related or supported control and data paths.

At step 270, the UE GGSN sends an update PDP context response message to the SGSN to cause establishment of a GTP tunnel between the SGSN 140 and the first IP-CAN GGSN 150-1 or UE GGSN 150-2. The bearer GTP tunnel supporting non-3GPP access may now be deleted as the newly established UE mobile services path formed by concatenating the newly established RAB and GTP tunnel now provides various mobile services to the UE.

The create or update PDP context request message described herein may include the Internet protocol (IP) address and International Mobile Subscriber Identity (IMSI) of the UE, as well as Protocol Configuration Options (PCO) or other structure including a handover indicator such as a bit, flag or other indicator of a desire to handover UE servicing between, illustratively, UMTS and non-UMTS IP-CAN without establishing a new control session. In various embodiments, the handover indicator is used to indicate whether or not the handover is associated with a new control request (i.e., attach or reattach the UE to the SGSN or another SGSN).

In various embodiments, the non-new-control indication comprises a data element set to a first state or pattern within a Protocol Configuration Options (PCO) field of PDP request message, a GTP header or other structure. In response to the data element being set to the first state or pattern, the GGSN and other entities operate to maintain the current UE to SGSN attachment. Similarly, in response to the data element being set to a second state or pattern, the UE is reattached to the SGSN or attached to another SGSN (i.e., new control of the UE is established).

Figure 3:
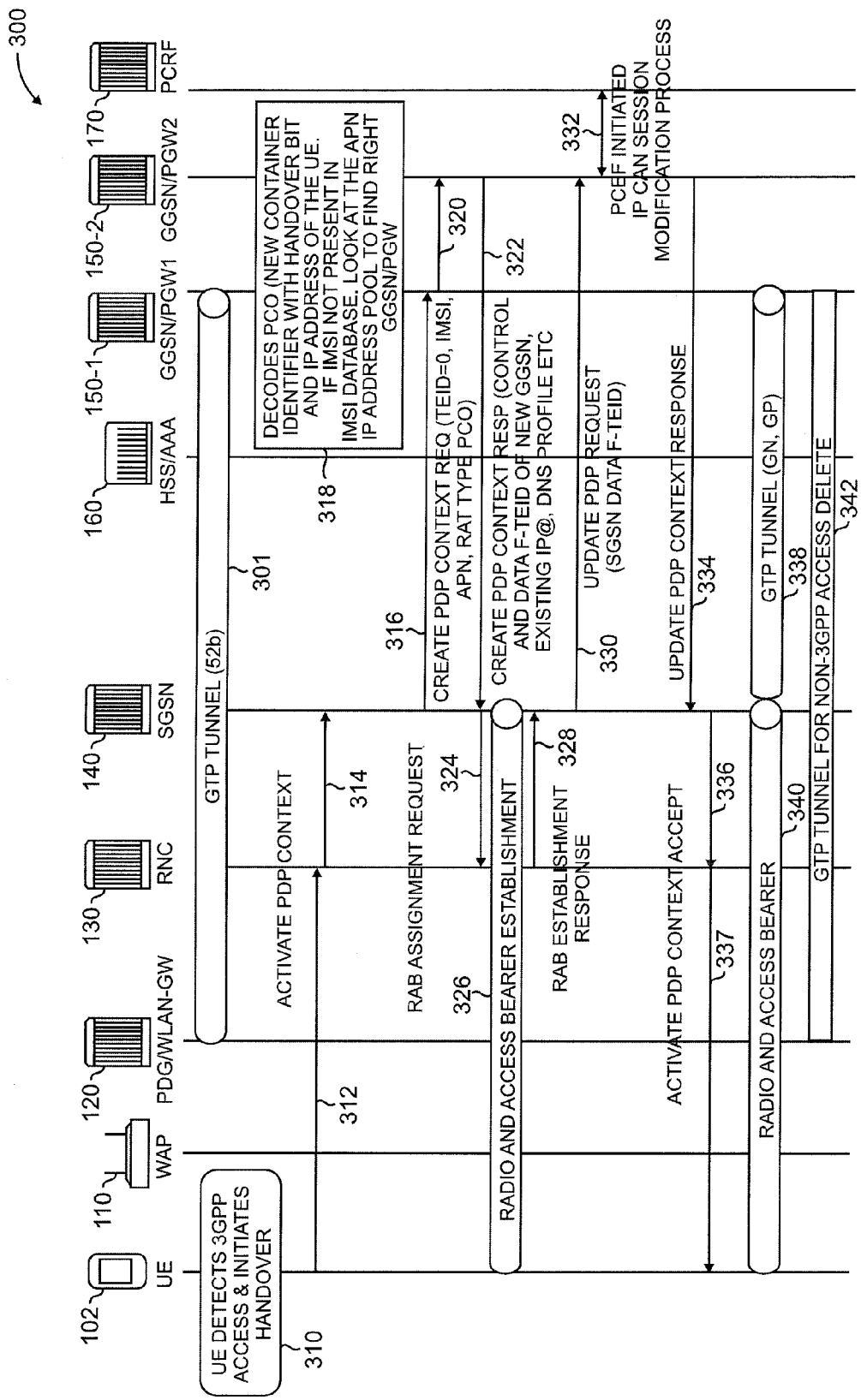
FIGS. 3-4 depict call flow diagrams of methods according to various embodiments.

FIG. 3 depicts a call flow diagram of a method according to various embodiments and useful in understanding the operations depicted above with respect to FIGS. 1-2. As an initial condition, the UE 102 is authenticated at the WAP 110 and is associated with one or more public data packet (PDP) addresses anchored at the GGSN/PGW.

At 310, the UE detects available 3GPP access, determines to initiate a Wi-Fi to UMTS handover, and propagates (312, 314) an activate PDP context message to the SGSN 140 via the RNC 130.

The SGSN 140 responsively generates and propagates (316) to the GGSN 150 a PDP context request message including details of the UE activate PDP context message.

At 318, the GGSN/PGW 150 decodes the PCO to extract therefrom the IP address and IMSI of the UE, as well as the handover indicator, illustratively a PCO including a handover bit along with the IP address of the UE). The IMSI is used to retrieve from the local IMSI database session information associated with the UE 102, such as session information pertaining to traffic supported by the GTP tunnel 301 between the GGSN 150 and PDG/WLAN-GW 120.

If the IMSI associated with the UE is not present in the local IMSI database, then the GGSN 150 examines the APN IP address pool to identify the GGSN/PGW associated with the UE 102. For example, first GGSN/PGW 150-1 may process the create PDP context request and determine that second GGSN/PGW 150-2 is the appropriate GGSN. In this case, the create PDP context request message is forwarded (320) to the second GGSN/PGW 150-2. For purposes of this discussion it will be assumed that the second GGSN/PGW is associated with the IMSI of the UE 102.

At 322, the second GGSN/PGW 150-2 transmits a create PDP context response to the RNC 130 via the SGSN 140 (322, 324) to provide thereby radio and access bearer establishment 326 between the UE 102 and SGSN 140. The RNC 130 transmits (328) a radio access bearer (RAB) establishment response message to the SGSN 140, which responsively transmits (330) an update PDP request message to the second GGSN/PGW 150-2.

At 332, the second GGSN/PGW 150-2 interacts with the PCRF 170 to initiate an IP-CAN session modification process.

At step 334, the second GGSN/PGW 150-2 transmits (334) an update PDP context response message to the SGSN 140, which responsively transmits an activated PDP context except message to the UE 102 via the RNC 130 (336, 337).

In this manner, communication between the UE 102 and GGSN/PGW 150 is provided by a radio and access bearer path 340 between the UE 102 and SGSN 140, and a GTP tunnel 338 between the SGSN 140 and GGSN 150. Traffic associated with sessions previously supported by the GTP tunnel 301 is now supported by the concatenated radio and access bearer 340 and GTP tunnel 338. At 342, the GTP tunnel previously supporting traffic to the WAP 110 is deleted.

Figure 4:
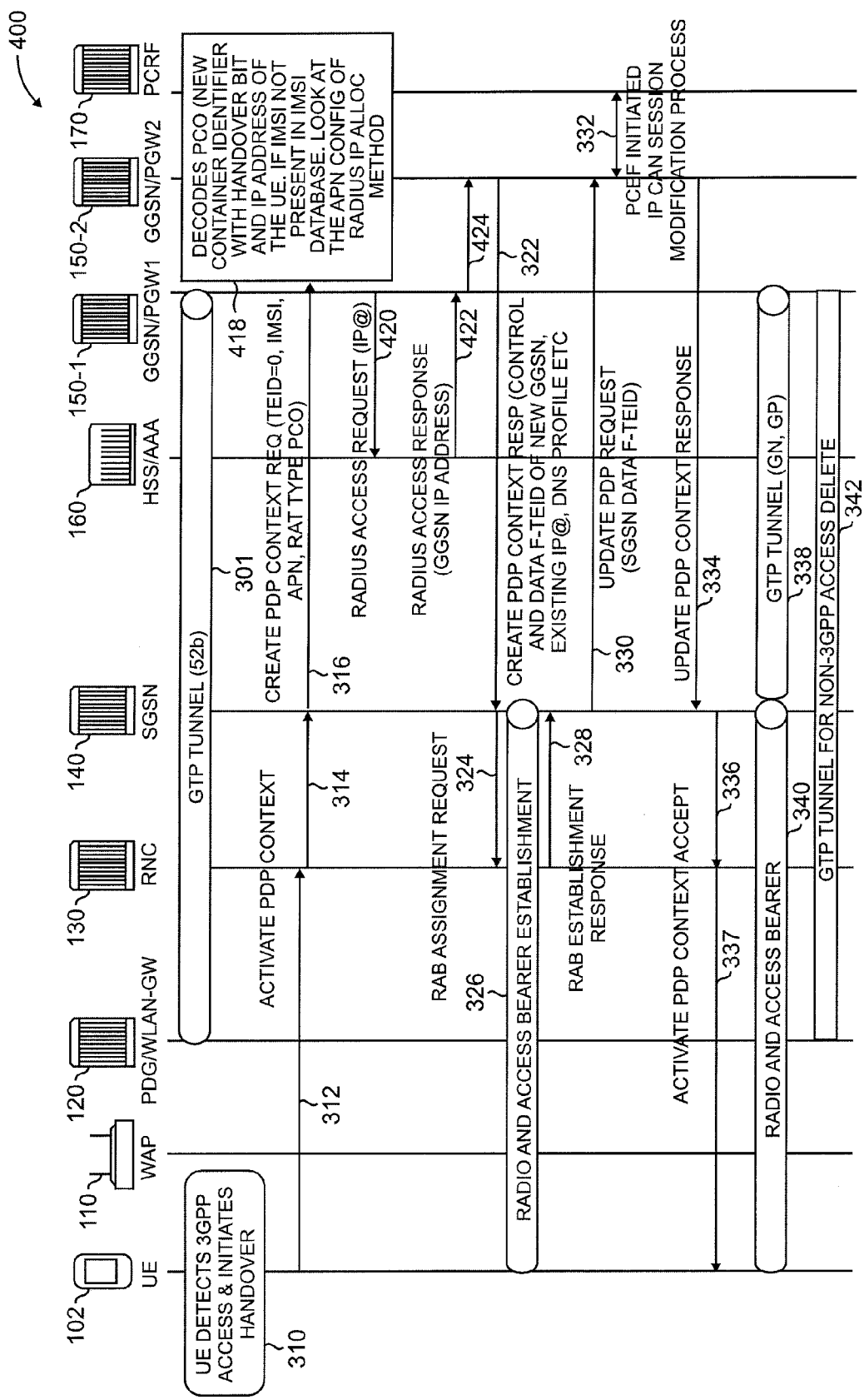

FIG. 4 depicts a call flow diagram of a method according to various embodiments and useful in understanding the operations depicted above with respect to FIGS. 1-2. The call flow diagram 400 depicted in FIG. 4 operates in a substantially similar fashion to the call flow diagram 300 depicted in FIG. 3, except that the HSS/AAA 160 is used to determine the appropriate GGSN/PGW associated with the UE 102.

Specifically, after the first GGSN/PGW 150-1 receives the create PDP context request message at 216, if the IMSI of the UE 102 is not present in the local IMSI database, then at 418 the APN configuration of the (illustratively) RADIUS server is examined. Specifically, at 420 a RADIUS access request message (IP address) is propagated to the HSS/AAA 160, which responsively provides a RADIUS access response message including the IP address of the appropriate GGSN/PGW (illustratively 150-2 in this example). The RADIUS access response message is forwarded at 424 from the first GGSN/PGW 150-1 to the second GGSN/PGW 150-2. The remainder of the call flow diagram 400 proceeds in substantially the same manner as described above with respect to the call flow diagram 300 of FIG. 3.

The embodiments discussed above with respect to FIGS. 1-4 contemplate the use of a flag, bit or other handover indication as well as the IP address allocated to the UE 102 by the WAP 110 to support a handover to, illustratively, the UMTS infrastructure. The call flow diagram 300 of FIG. 3 utilizes the APN IP address pool to identify the appropriate GGSN/PGW associated with the UE, whereas the call flow diagram 400 of FIG. 4 uses the APN configuration of the RADIUS IP allocation method to determine similar information.

Various embodiments are adapted to broadly address UE handovers between multiple types of access technologies, such as DSL, cable, Wi-Fi, WiMAX, 3G, 4G LTE and so on.

According to various embodiments, a UE requiring, illustratively, a handover or transition from a Wi-Fi network to a UMTS network generates a handover control request including an indication that the required handover is NOT to be construed as a new control request. In various embodiments, the following events may occur: (1) The UE generates the handover control request including the "non-new-control" indication, which request is propagated to the GGSN associated with the desired UMTS network, either directly or via the GGSN associated with the WAP to which the UE is presently authenticated. (2) A GGSN in communication with the WAP receives the control request and identifies the "non-new-control" indication given by UE as well as the UE itself. (3) If the GGSN does not find UE credentials in its database, then the GGSN identifies the appropriate GGSN (e.g., a GGSN capable of serving the UE) and passes the control request accordingly. (4) The appropriate GGSN processes the request and sends a response to the corresponding SGSN letting it know of new control and data tunnel endpoints of the GGSN for accommodating the UE, and responds back with the same IP address which it received from the handset.

Figure 5:
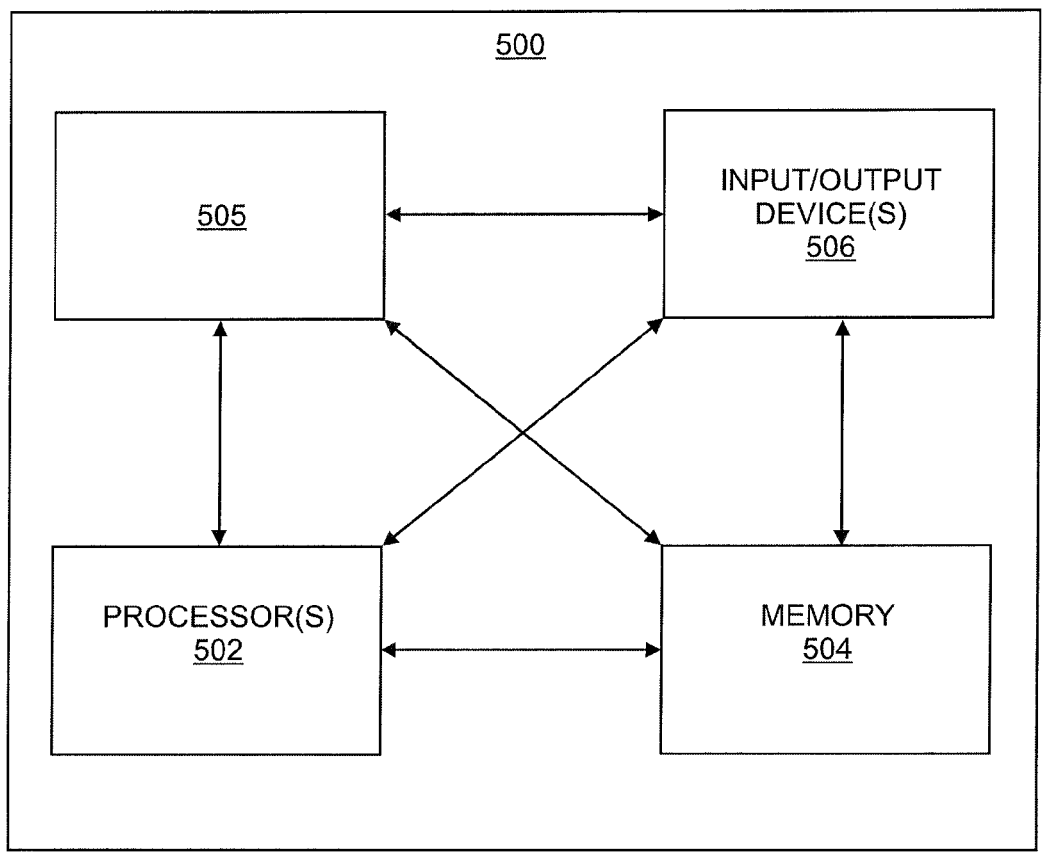
FIG. 5 depicts a high-level block diagram of a general purpose computing device suitable for use in various embodiments.

FIG. 5 depicts a high-level block diagram of a computing device, such as a processor in a telecom network element, suitable for use in performing functions described herein such as those associated with the various elements described herein with respect to the figures.

As depicted in FIG. 5, computing device 500 includes a processor element 502 (e.g., a central processing unit (CPU) and/or other suitable processor(s)), a memory 504 (e.g., random access memory (RAM), read only memory (ROM), and the like), cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

In the case of a routing or switching device such as WAP 110, PDG/WLAN-GW 120, SGSN 140, GGSN/PGW 150 and the like, the cooperating module process 505 may implement various switching devices, routing devices, interface devices and so on as known to those skilled in the art. Thus, the computing device 500 is implemented within the context of such a routing or switching device (or within the context of one or more modules or sub-elements of such a device), further functions appropriate to that routing or switching device are also contemplated and these further functions are in communication with or otherwise associated with the processor 502, input-output devices 506 and memory 504 of the computing device 500 described herein.

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 505 can be loaded into memory 504 and executed by processor 502 to implement the functions as discussed herein. Thus, cooperating process 505 (including associated data structures) can be stored on a computer readable storage medium, e.g., RAM memory, magnetic or optical drive or diskette, and the like.

It will be appreciated that computing device 500 depicted in FIG. 5 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method, comprising:
   receiving, by a Gateway GPRS Support Node (GGSN), a create packet data protocol (PDP) request associated with a UE authenticated with a first Internet Protocol Connectivity Access Network (IP-CAN) and attached to a Serving GPRS support node (SGSN), wherein the create PDP request comprises a non-new-control indication included within a Protocol Configuration Options (PCO) field of the create PDP request, wherein the non-new-control indication comprises an Internet Protocol (IP) address of the UE; and
   creating, by the GGSN in response to the non-new-control indication within the create PDP request, a PDP context configured to establish a second IP-CAN path between the UE, the SGSN and the GGSN without changing UE attachment to the SGSN.

2. The method of claim 1, wherein said first and second IP-CAN comprise a UMTS network and a non-UMTS network.

3. The method of claim 2, further comprising determining whether said create PDP request is to be associated with a Wi-Fi to UMTS handover of said UE if said UE is associated with an active session with another GGSN in response to a GGSN Wi-Fi session record of the another GGSN being associated with the IP address to of the UE.

4. The method of claim 1, further comprising:
   determining, by the GGSN, whether the UE is associated with the GGSN; and
   if the UE is not associated with the GGSN, determining a GGSN associated with the UE using an address association mechanism.

5. The method of claim 4, wherein said address association mechanism comprises examining an Access Point Name (APN) Internet Protocol (IP) address pool associated with at least one other GGSN.

6. The method of claim 4, wherein said address association mechanism comprises examining an Access Point Name (APN) configuration of Remote Authentication Dial-In User Service (RADIUS) IP allocations.

7. The method of claim 1, further comprising:
   receiving, by the GGSN, a second create PDP request associated with the UE, wherein the second create PDP request comprises a PCO field, wherein the PCO field comprises a data element set to a state.

8. The method of claim 7, further comprising:
   based on a determination that the PCO field of the second create PDP request is set to the state, initiating a new attach of said UE to a SGSN.

9. The method of claim 7, further comprising:
   based on a determination that the PCO field of the second create PDP request is set to the state, initiating a new attach of said UE to a GGSN.

10. The method of claim 1, wherein the non-new-control indication further comprises a handover bit.

11. The method of claim 1, wherein the non-new-control indication comprises a data element within a header of a GPRS Tunneling Protocol (GTP) packet being set to a first state.

12. The method of claim 1, further comprising:
    propagating, by the GGSN toward the SGSN, a PDP context response message including the IP address of the UE.

13. The method of claim 12, further comprising determining said UE to be associated with an active session of said GGSN in response to a GGSN Wi-Fi session record of said GGSN being associated with the IP address of the UE.

14. The method of claim 13, wherein said GGSN Wi-Fi session record includes an International Mobile Subscriber Identity (IMSI) indicative of said UE and an Access Point Name (APN) indicative of a wireless access point (WAP).

15. The method of claim 1, further comprising determining whether said create PDP request is to be associated with a Wi-Fi to UMTS handover of said UE from another GGSN in response to a GGSN Wi-Fi session record of the another GGSN being associated with the IP address of the UE.

16. The method of claim 15, wherein said another GGSN is determined using an address association mechanism.

17. An apparatus for maintaining UE control session attachment while changing UE data session bearers, the apparatus comprising:
    a processor and a memory communicatively connected to the processor, the processor configured to:
       receive a create packet data protocol (PDP) request associated with a UE authenticated with a first Internet Protocol Connectivity Access Network (IP-CAN) and attached to a Serving GPRS support node (SGSN), wherein the create PDP request comprises a non-new-control indication included within a Protocol Configuration Options (PCO) field of the create PDP request, wherein the non-new-control indication comprises an Internet Protocol (IP) address of the UE; and
       create, in response to the non-new-control indication within the create PDP request, a PDP context configured to establish a second IP-CAN path between the UE, the SGSN and the GGSN without changing UE attachment to the SGSN.

18. The apparatus of claim 17, wherein said apparatus is included within a Gateway GPRS Support Node (GGSN).

19. A non-transitory computer-readable storage medium storing instructions which, when executed by a computer, adapt the operation of the computer to provide a method, the method comprising:
    receiving, by a Gateway GPRS Support Node (GGSN), a create packet data protocol (PDP) request associated with a UE authenticated with a first Internet Protocol Connectivity Access Network (IP-CAN) and attached to a Serving GPRS support node (SGSN), wherein the create PDP request comprises a non-new-control indication included within a Protocol Configuration Options (PCO) field of the create PDP request, wherein the non-new-control indication comprises an Internet Protocol (IP) address of the UE; and
    creating, by the GGSN in response to the non-new-control indication within the create PDP request, a PDP context configured to establish a second IP-CAN path between the UE, the SGSN and the GGSN without changing UE attachment to the SGSN.

20. A computer program product comprising a non-transitory computer-readable storage medium storing computer instructions which, when executed by a processor in a telecom network element, adapt the operation of the telecom network element to provide a method, the method comprising:

receiving, by a Gateway GPRS Support Node (GGSN), a create packet data protocol (PDP) request associated with a UE authenticated with a first Internet Protocol Connectivity Access Network (IP-CAN) and attached to a Serving GPRS support node (SGSN), wherein the create PDP request comprises a non-new-control indication included within a Protocol Configuration Options (PCO) field of the create PDP request, wherein the non-new-control indication comprises an Internet Protocol (IP) address of the UE; and creating, by the GGSN in response to the non-new-control indication within the create PDP request, a PDP context configured to establish a second IP-CAN path between the UE, the SGSN and the GGSN without changing UE attachment to the SGSN.

\* \* \* \* \*